(12) United States Patent
Manzardo et al.

(10) Patent No.: US 6,449,247 B1
(45) Date of Patent: Sep. 10, 2002

(54) SYSTEM AND METHOD FOR MAINTAINING CALL SERVICES FOR REMOTE USERS IN THE EVENT OF A COMMUNICATION FAILURE

(75) Inventors: Marcel Manzardo, Los Gatos; Abid Farooq, Danville, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/199,119

(22) Filed: Nov. 24, 1998

(51) Int. Cl.<sup>7</sup> .................................................. H04J 3/14
(52) U.S. Cl. ........................ 370/216; 370/252; 709/220; 709/227
(58) Field of Search ................................. 370/216, 217, 370/218, 219, 220, 225, 227, 228, 465, 252; 709/224, 225, 229, 220, 221, 222, 223, 227, 228

(56) References Cited

U.S. PATENT DOCUMENTS

| | | | |
|---|---|---|---|
| 5,457,729 A | 10/1995 | Hamann et al. | 379/2 |
| 5,583,856 A | 12/1996 | Weir | 370/359 |
| 5,715,293 A | 2/1998 | Mahoney | 379/23 |
| 5,974,463 A * | 10/1999 | Warrier et al. | 709/225 |
| 6,058,420 A * | 5/2000 | Davies | 709/224 |
| 6,178,170 B1 * | 1/2001 | Duree et al. | 370/465 |
| 6,308,282 B1 * | 10/2001 | Huang et al. | 370/216 |

* cited by examiner

Primary Examiner—Douglas Olms
Assistant Examiner—Shick Hom

(57) ABSTRACT

A telecommunications system (20) includes a fail-safe subsystem (22) capable of maintaining call services to remote users in the event of a communication failure. The fail-safe subsystem (22) is coupled to a communication link (16) between a main switch (12) and a remote shelf (14). The subsystem (22) passively monitors the status of the communication link (16). Upon detecting a failure, the subsystem (22) provides a limited set of call services to remote users by providing local switching services. Upon re-establishing communications with the main switch (12), the fail-safe subsystem (22) re-synchronizes the main switch (12) and remote shelf (14) by emulating a conventional call setup procedure for each call placed through the remote shelf (14) during the failure.

16 Claims, 3 Drawing Sheets

SYSTEM AND METHOD FOR MAINTAINING CALL SERVICES FOR REMOTE USERS IN THE EVENT OF A COMMUNICATION FAILURE

BACKGROUND OF THE INVENTION

1. Technical Field of the Invention

The present invention generally relates to telecommunications systems, and in particular, to a telecommunication system that includes a subsystem for providing call services in the event of a communication failure.

2. Description of the Related Art

Conventional telecommunication systems typically includes numerous signal transfer point devices, such as switches, line trunk units (LTUs), and remote communications modules (RCMs), coupled together by a multitude of telecommunication line links. FIG. 1 illustrates some of the components commonly found in prior art telecommunication networks. The network 10 includes a main switch 12 connected to a remote shelf 14 using a conventional communications link 16, such as an isochronous circuit-switched network. Typically, the main switch 12 can be connected to additional remote shelves, as well as to the central office (CO) of a common carrier using a public switched telephone network (PSTN). One or more peripheral units (not shown), such as telephones, modems, faxes, etc., can be connected to the remote shelf 14.

The main switch 12 can be a networked switch for providing switching and call setup services to the remote shelf 14. For example, the main switch 12 can be implemented using a computerized branch exchange (CBX) or private branch exchange (PBX), such as the Hicom 300E manufactured by Siemens Corporation. A PBX typically provides bandwidth and switching capacity to one or more remote shelves and thus, a PBX can act as a central switching hub for several remote shelves.

The remote shelf 14 includes a plurality of analog or digital ports and interface circuits for connecting a group of peripheral units. Typically, the remote shelf 14 has a relatively limited functionality, and it relies on the main switch 12 for most call services, such as call set-up and switching. Consequently, all calls placed between peripheral units and the CO are routed through the main switch 12. The remote shelf 14 can be an LTU or RCM, such as one manufactured by Siemens Corporation, located several kilometers (up to 700 miles) from the main switch 12.

The communications link 16 interconnects the remote shelf 14 and the main switch 12 using either a fiber-optic or copper cable. Typically, the main switch 12 and remote shelf 14 are interconnected using a circuit-switched network protocol, such as the T1, T2, T3, and T4 carriers developed by the Bell System, or the E1, E2, E3 carriers established by CCITT. These standard protocols are isochronous, that is, data is transferred between devices at the same average bit rate.

In addition to being isochronous, conventional telecommunications networks are designed to handle pulse-coded modulated (PCM) voice as well as signalling information. PCM voice is a digital representation of voice input or computer data that is transmitted through a conventional analog telephone input using a modem. Signalling information is digital data that does not represent PCM voice and is generally used for call set-up. Call setup is the process of reserving network resources, such as channel time slots and lines, for establishing a point-to-point circuit to effectuate the call. The signalling information can be transmitted in-band or out-of-band. In-band signalling uses the same communication channel as PCM voice/data to accomplish call setup, while out-of-band signalling uses a separate channel, such as a common channel, to set up calls.

Telecommunications equipment generally represents a large capital expense and has a long service life. Accordingly, many installed telecommunication networks include older equipment which lacks fault recovery features for enhancing service reliability. In these systems, a communication failure between the main switch 12 and remote shelf 14 can cause users connected to the remote shelf 14 to lose all call services. The communication failure can be caused by failure of either the main switch 12 or the communication link 16.

In such a system, to maintain call services at the remote shelf 14 in the event of a failure, it is necessary to modify either the remote shelf 14 or the main switch 12 to include backup services that permit a degree of fault tolerance. However, modifying the functionality of the main switch 12 and remote shelf 14 typically requires replacing these devices, as most older telecommunication equipment is not designed to be incrementally upgraded. In many instances, such a costly upgrade is unacceptable. An alternative solution would be to provide a networked switch, such as a PBX, at the remote shelf 14 location. In this arrangement, remote users would no longer rely on the main switch 12 for call services, and a failure of the main switch 12 or link 16 would not lead to a cessation of remote services. However, this solution is not a cost-effective alternative for remote locations having a small number of users.

Therefore, there is a need for an apparatus that can be easily integrated into an existing telecommunications network to provide backup call services to remote users in the event of a communication failure, without requiring expensive upgrades to existing telecommunication equipment.

SUMMARY OF THE INVENTION

It is an advantage of the present invention to provide an apparatus that maintains call services at a remote location in the event of a communication failure with a main switch. It is also an advantage of the present invention to provide an apparatus that can be easily integrated into an existing network without costly upgrades to the previously installed telecommunication equipment.

The present invention provides a fail-safe subsystem that can be connected to a communication link between a main switch and a remote shelf. During normal operation, the subsystem remains in a pass-through mode. In pass-through mode, the subsystem passively monitors and stores all call information passed between the main switch and the remote shelf. In the event of a communication failure, the subsystem activates to maintain virtually uninterrupted call services to the remote shelf. To accomplish this, the subsystem includes a local digital switching matrix, which provides local switching services to remote users based on the stored call setup information. Upon restoration of communications between the main switch and remote shelf, the fail-safe subsystem re-configures the main switch with the current calling status of the remote shelf before returning to its pass-through mode of operation. Thus, the main switch and remote shelf can be re-connected in a relatively seamless manner without affecting calls established during the failure.

BRIEF DESCRIPTION OF THE DRAWINGS

The invention is pointed with particularity in the appended claims. However, other features of the invention will become more apparent, and the invention will be best understood by referring to the following Detailed Description in conjunction with the accompanying drawings, in which:

DETAILED DESCRIPTION OF THE INVENTION

Figure 1:
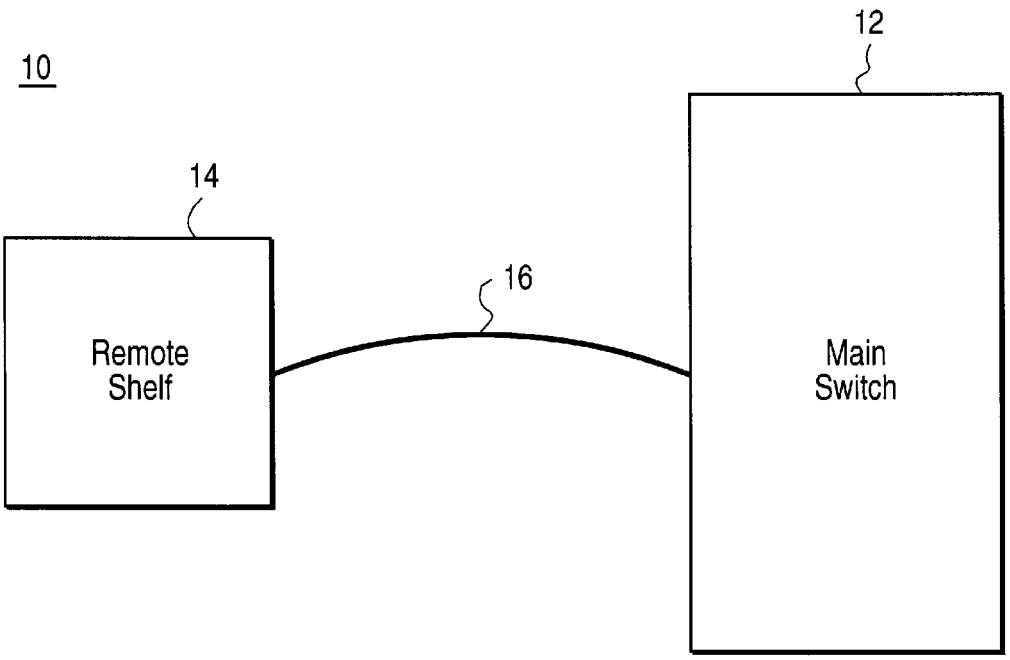
FIG. 1 illustrates a block diagram of a prior art telecommunication systems.
Figure 2:
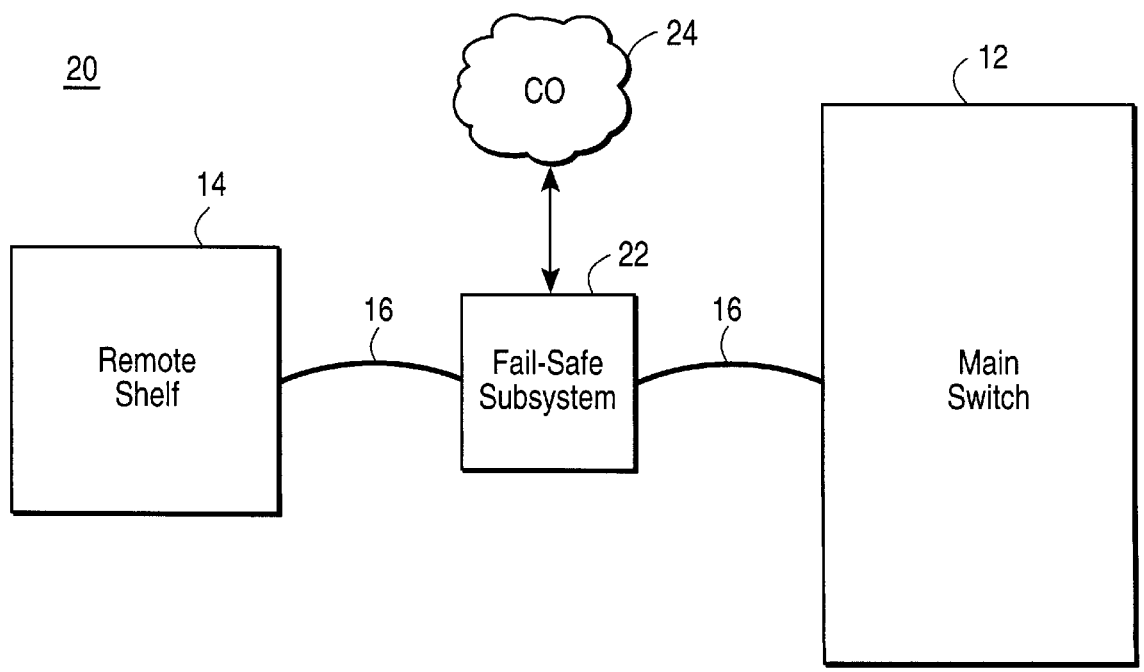
FIG. 2 illustrates a block diagram of a telecommunication system that includes a fail-safe subsystem in accordance with an embodiment of the present invention.

Referring now to the drawings, and in particular to FIG. 2, there is shown a block diagram of a telecommunication system 20 that includes the fail-safe subsystem 22. Telecommunication system 20 includes the main switch 12 coupled to a remote shelf 14 via a communication link 16. Interposed on the communication link 16 is the fail-safe subsystem 22.

The main switch 12 can be a networked switch, such as a PBX, for providing call services to the remote shelf 14; while the remote shelf 14 provides interface ports to one or more peripheral units. The communications link 16 can be any means for connecting the remote shelf 14 and the main switch 12, such as a fiber-optic or copper cable. Additionally, the invention is not limited to any specific telecommunication protocol used over the link 16. For instance, link 16 can rely on a conventional circuit-switched network protocol, such as the T1, T2, T3, and T4 carriers, or the E1, E2, E3 carriers, as well as hybrid protocols, such as ISDN (integrated services digital network). In addition to including circuits for interfacing with the link 16, the fail-safe subsystem 22 can also include an interface for communicating with a central office (CO) 24. The CO interface permits remote users to place calls outside of the remote location serviced by the remote shelf 14 during a communication failure.

The subsystem 22 can be adapted to be integrated into any telecommunication network, including a private subscriber network or PSTN.

The subsystem 22 is capable of performing three functions: 1) maintaining remote calls existing at the time of failure; 2) providing call services to remote users during the failure; and 3) re-synchronizing the main switch 12 to the remote shelf 14 after the failure is abated. The subsystem 22 can be coupled to the communication link 16 using conventional physical interfaces suited for the purpose. Since most communication failures are infrequent events that last only short periods, it is not necessary that the subsystem 22 provides a full set of call services. Accordingly, to reduce costs, the subsystem 22 can be implemented to provide only basic call features, such as call placement, during a communication failure.

Figure 3:
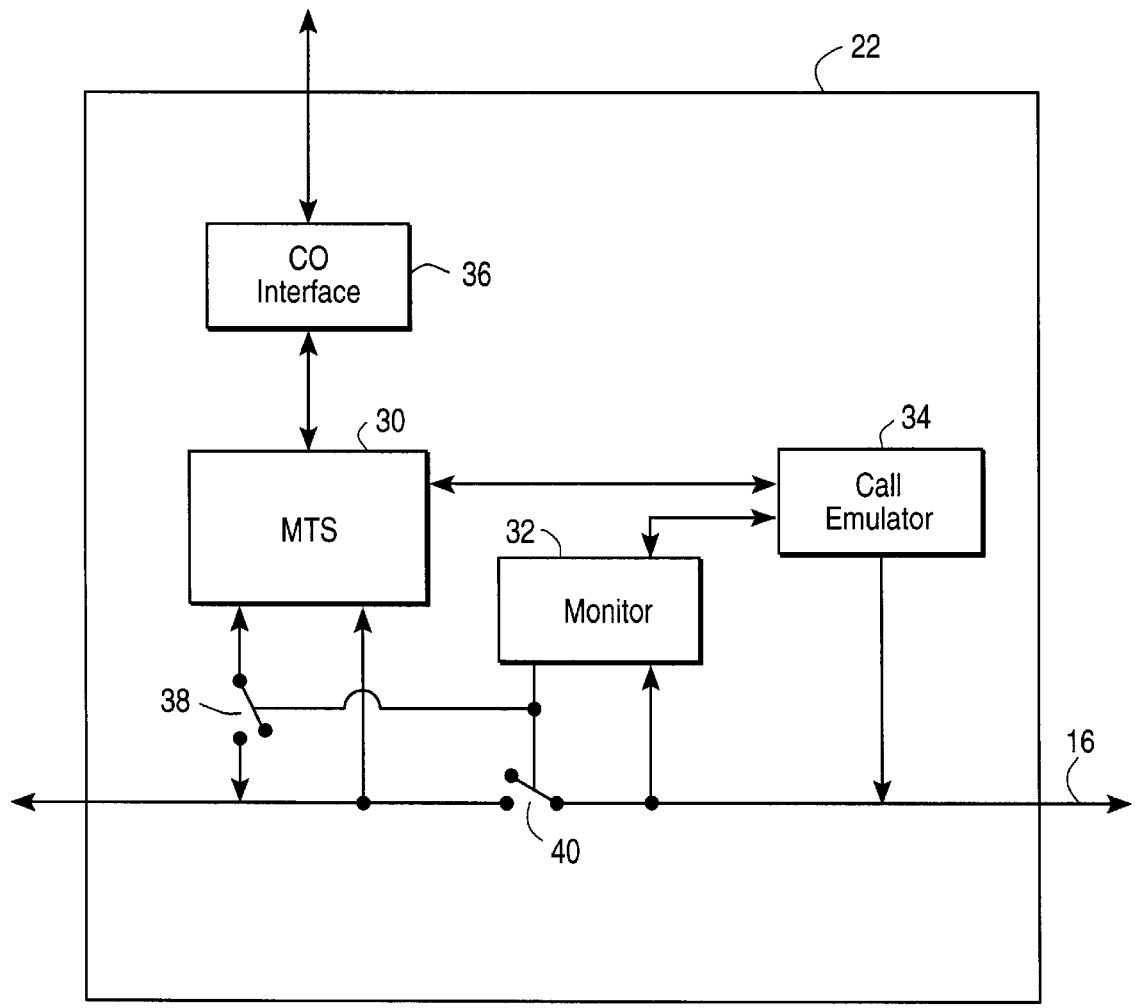
FIG. 3 illustrates a detailed block diagram of the fail-safe subsystem shown in FIG. 2.

FIG. 3 illustrates a detailed block diagram of the fail-safe subsystem 22. The fail-safe subsystem 22 can include a memory time switch (MTS) 30, a link monitor 32, a call emulator 34, and a central office (CO) interface 36.

The MTS 30 can be a commercially available MTS, such as the Memory Time Switch Small (MTSS) PEB 2046 manufactured by Siemens Corporation, that includes a programmable digital switching matrix for providing switching services, including time slot assignment. The digital switching matrix dynamically maps a plurality of inputs from call sources to a plurality of outputs to permit communication circuits to be established between call sources and destinations. In the subsystem 22, the MTS 30 provides local switching services to the remote shelf 14 during communication failures. Essentially, the switching function of the MTS 30 is similar to the switching service provided by the main switch 12 during normal operation. In addition to providing backup switching services, the MTS 30 also stores local call setup information passed between the main switch 12 and remote shelf 14 during normal operation, creating an image of call setup information located within the subsystem 22. The stored image of the call setup information allows the MTS 30 to continuously mirror the state of the digital switch located at the main switch 12. This permits the fail-safe subsystem 22 to preserve all existing calls when a failure occurs, without disrupting service to the remote users. During a failure, the call setup information stored by the MTS 30 is updated as new calls are placed at the remote shelf 14.

In communication with the MTS 30, the CO interface 36 permits remote users to place calls through the central office of a common carrier. This allows users at the remote shelf 14 to bypass the failed communications link 16 and main switch 12.

The link monitor 32 passively monitors the status of the communication link 16 to detect predetermined conditions indicating whether communications between the main switch 12 and remote shelf 14 have failed. Upon detecting a predetermined state indicating a failure, the monitor 32 activates a switch 40 to isolate the failed communications path from the remote shelf 12. The monitor 32 then closes a second switch 38 to allow the MTS 30 to take over call switching for remote users connected to the remote shelf 14. The switch-over can occur with such speed that it is virtually unnoticeable by remote users.

The monitor 32 can be coupled to the link 16 using high impedance or optical taps, depending on whether the link 16 is made of copper wire or fiber optic cable. A number of different techniques can be used to monitor the status of the communications between the main switch 12 and remote shelf 14. For example, a dedicated wire can be included in the communications link that carries a signal indicating the health of the main switch 12 and link 16. In this case, the monitor 32 can be simply connected to this dedicated wire to detect when a communication failure occurs. Alternatively, the monitor 32 can be responsive to conventional clock signals typically transmitted between the main switch 12 and remote shelf 14. Anomalies detected in one or more clock signals will indicate that communication between the main switch 12 and remote shelf 14 have failed.

Having the monitor 32 located separately from the switch 12 substantially improves the fault tolerance of the communication system. For instance, during a power outage, the switch 12 cannot communicate its failed status to the remote shelf 14. Moreover, providing battery backup for the switch 12 is prohibitively expensive, whereas battery backup for the fail-safe subsystem 22 is practicable. Thus, in addition to its other advantages, the fail-safe subsystem 22, with monitor 32, provides a cost-effective means for overcoming system failures caused by a power failure at the switch 12.

The call emulator 34 is capable of transmitting call setup information to the main switch 12, shortly after communications have been restored. This permits the main switch 12 to be re-synchronized to the remote shelf 14. By doing this, calls in progress during the failure will not be lost when the main switch 12 resumes normal operation.

The call emulator 34 relies on the image of the call setup information stored locally in the MTS 30 to re-configure the main switch 12. After re-synchronizing the main switch 12, the call emulator indicates to the monitor 32 that the fail-safe subsystem 22 is to re-enter the pass-through mode of operation. The monitor 32 opens switch 38 to disconnect the local MTS 30 and closes switch 40 to allow switching and call services to be taken over by the main switch 12. This can occur without noticeable disruption to calls in progress.

The fail-safe subsystem 22 can be implemented as a microprocessor-based telecommunications server. Software routines can be used to implement many of the functions of the subsystem 22, such as those performed by the monitor 32 and the call emulator 34. Conventional telecommunication interface cards can be included in the server to implement the functions of the MTS 30, switches 38–40, and CO interface 36, as well as to provide interfaces to the link 16.

Figure 4:
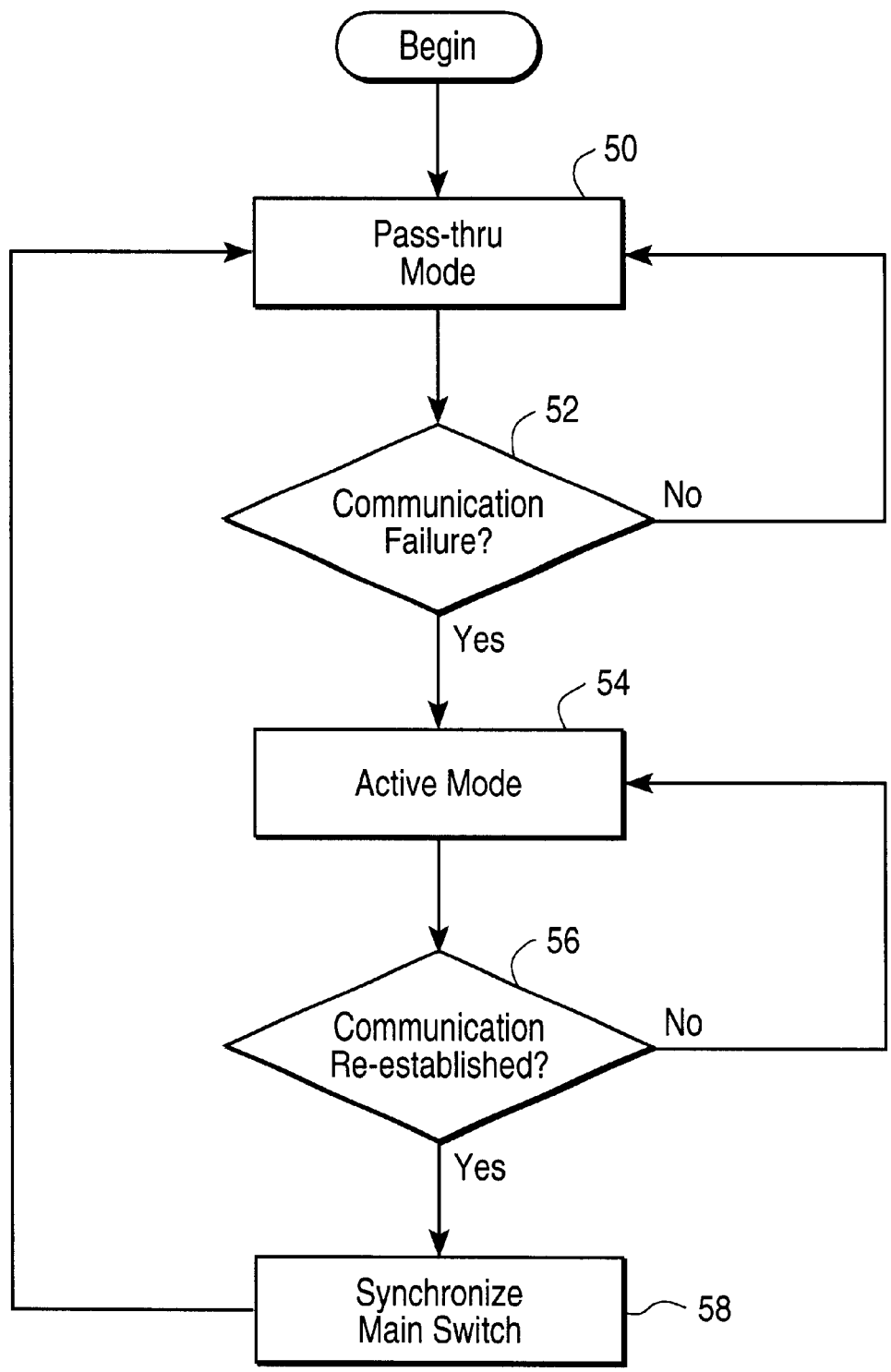
FIG. 4 illustrates a flow diagram of a method for providing call services to remote users in the event of a communication failure.

FIG. 4 illustrates a method of providing call services to the remote shelf 14 in the event of a communication failure with the main switch 12. In step 50, the fail-safe subsystem 22 powers up in the pass-through mode. In the pass-through mode, the subsystem 22 passively monitors all call setup information passed between the main switch 12 and remote shelf 14. This information is stored in the MTS 30. In addition, while in the pass-through mode, the subsystem 22 continuously monitors the communication link 16 for a failure (step 52). If no failure is detected, the subsystem 22 remains in the pass-through mode. However, if a communication failure is detected, the subsystem 22 enters the active mode (step 54). While in the active mode, the subsystem provides local switching services to the remote users and basic call functions. Subsystem 22 also monitors the status of the communication link 16 to determine whether communication has been re-established with the main switch 12 (step 56). The subsystem 22 remains in the active mode until communication has been re-established. Upon re-established communications, subsystem 22 begins the process of re-synchronizing the main switch 12 to the remote shelf 14 (step 58). After re-synchronizing the main switch 12 and remote shelf 14, the subsystem 22 re-enters the pass-through mode (step 50) and call services provided by the main switch 12 are resumed without interruption.

The function of the fail-safe subsystem 22 is entirely transparent to the remote users.

While specific embodiments of the present invention have been shown and described, it will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A subsystem for use with a telecommunication system including a main switch capable of communicating with a remote shelf over a link, the subsystem comprising:

means for connecting the subsystem to the link; and switch adapted to provide call services to the remote shelf in the event of a communication failure between the main switch and the remote shelf;

wherein the subsystem includes a call emulator for synchronizing the main switch to one or more calls placed at the remote shelf during the communications failure.

2. The subsystem of claim 1, wherein the call services include basic call functions.

3. The subsystem of claim 1, wherein the subsystem is capable of storing an image of call setup information passed between the main switch and the remote shelf.

4. The subsystem of claim 1, wherein the call emulator transmits call setup information to the main switch by emulating a call setup procedure for each of the calls, the call setup procedure being the same as that which is used between the remote shelf and main switch during normal operation.

5. A telecommunications system, comprising:

a remote shelf;

a main switch;

a communication link coupling the main switch and remote shelf; and a fail-safe subsystem including a server, operatively coupled to the communication link, for providing call services to at least one device connected to the remote shelf in the event of a communication failure between the main switch and remote shelf, the server maintaining an image of call setup information passed between the remote shelf and the main switch, and the server monitoring the status of the communication link and activating upon detection of the communication failure, the fail-safe subsystem including an emulator for synchronizing the main switch to one or more calls placed at the remote shelf during the communications failure.

6. The telecommunications system of claim 5, wherein the main switch includes a PBX.

7. The telecommunications system of claim 5, wherein the server includes a digital switching matrix.

8. The telecommunications system of claim 5, wherein the server includes means for accessing a central office.

9. The telecommunications system of claim 5, wherein the communication link is selected from a group consisting of a T1 carrier, an E1 carrier, and an ISDN carrier.

10. The telecommunications system of claim 5, wherein the server transparently passes information on the communication link while in a normal operating state.

11. A telecommunications subsystem for providing call services in the event of a communication failure between a remote shelf and a main switch, comprising:

means for storing an image of call setup information passed between the main switch and the remote shelf;

means for detecting a predetermined state on a communication link coupling the remote shelf and main switch;

means for providing call services to the remote shelf based on the image of setup information while the predetermined state exists; and means for transmitting call setup information to the main switch by emulating a call setup procedure for each call placed through the remote shelf.

12. The telecommunications subsystem of claim 11, further comprising:

a digital switching matrix for providing switching services during the communications failure.

13. The telecommunications subsystem of claim 11, wherein the subsystem further includes:

means for communicating with a central office while the predetermined state exists.

14. A method of providing call services to a remote shelf in the event of a communication failure between the remote shelf and a main switch, comprising:

generating an image of call setup information passed between the main switch and the remote shelf;

monitoring the status of a communication link between the remote shelf and the main switch;

providing call services to the remote shelf as a function of the image of setup information upon detecting the communication failure; and transmitting call setup information to the main switch by emulating a call setup procedure for each call placed through the remote shelf.

15. The method of claim 14, wherein the main switch includes a PBX.

16. The method of claim 14, further comprising:

detecting a power failure at the main switch using a server subsystem.

* * * * *